United States Patent
Gill (10) Patent No.: US 12,057,755 B2
(45) Date of Patent: Aug. 6, 2024

(54) ELECTRIC MOTOR POWER CORD FOR PORTABLE ELECTRICAL ASSEMBLY

(71) Applicant: Hougen Manufacturing, Inc., Swartz Creek, MI (US)

(72) Inventor: Jeffrey Steven Gill, Davison, MI (US)

(73) Assignee: Hougen Manufacturing, Inc., Swartz Creek, MI (US)

( * ) Notice: Subject to any disclaimer, the term of this patent is extended or adjusted under 35 U.S.C. 154(b) by 897 days.

(21) Appl. No.: 17/130,430

(22) Filed: Dec. 22, 2020

(65) Prior Publication Data

US 2021/0234428 A1 Jul. 29, 2021

Related U.S. Application Data

(60) Provisional application No. 62/967,364, filed on Jan. 29, 2020.

(51) Int. Cl.
| | |
|---|---|
| *B23B 45/02* | (2006.01) |
| *B25F 5/02* | (2006.01) |
| *B25H 1/00* | (2006.01) |
| *H02K 5/22* | (2006.01) |
| *H02K 7/116* | (2006.01) |
| *H02K 7/14* | (2006.01) |
| *H02K 11/33* | (2016.01) |

(52) U.S. Cl.
CPC ............. *H02K 5/225* (2013.01); *B23B 45/02* (2013.01); *B25F 5/02* (2013.01); *B25H 1/0071* (2013.01); *H02K 7/116* (2013.01); *H02K 7/145* (2013.01); *H02K 11/33* (2016.01)

(58) Field of Classification Search
CPC ........ H02K 5/225; H02K 7/116; H02K 7/145; H02K 11/33; B23B 45/02; B23B 2260/036; B23B 47/26; B25F 5/02; B25H 1/0071
USPC ........ 173/197, 81, 90, 140–141, 162.1, 198, 173/213, 168–171
See application file for complete search history.

(56) References Cited

U.S. PATENT DOCUMENTS

| | | | | | |
|---|---|---|---|---|---|
| 2,567,451 | A | * | 9/1951 | Smith ....................... | E21B 4/04 175/102 |
| 2,607,863 | A | * | 8/1952 | MacFarland ......... | H02G 11/003 439/162 |
| 3,192,813 | A | * | 7/1965 | Berberick ................ | H01K 3/02 83/365 |

(Continued)

FOREIGN PATENT DOCUMENTS

| | | | | |
|---|---|---|---|---|
| AU | 2013245525 A1 | * | 11/2013 | ......... A61B 17/3207 |
| CA | 2801744 A1 | * | 7/2013 | ......... A61B 17/3207 |
| WO | WO-2020173487 A1 | * | 9/2020 | |

*Primary Examiner* — Robert F Long
(74) *Attorney, Agent, or Firm* — Howard & Howard Attorneys PLLC (57) ABSTRACT

A portable electrical assembly includes an electric motor, a power module, and an electric motor power cord. The electric motor power cord is placed within a cavity of a housing of the portable electrical assembly and is operatively connected to the electric motor at first end and to the power module at a second end. The electric motor power cord is configured to move in response to the movement of the electric motor without the creation of sharp bends along its length as the electric motor moves between all of its possible operating positions including an extended position and a resting position and a plurality of intermediate position between the extended and resting position.

15 Claims, 9 Drawing Sheets

(56) References Cited

U.S. PATENT DOCUMENTS

| | | | | |
|---|---|---|---|---|
| 3,809,800 A * | 5/1974 | Fletcher | H01B 5/02 174/DIG. 8 |
| 3,837,757 A * | 9/1974 | Levine | B23Q 16/00 408/136 |
| 4,059,776 A * | 11/1977 | Schreiber | H02K 5/148 310/242 |
| 4,489,276 A * | 12/1984 | Yu | G01V 3/28 343/895 |
| 4,515,423 A * | 5/1985 | Moore | B25F 3/00 439/502 |
| 4,976,031 A * | 12/1990 | Miller | A01G 3/053 30/296.1 |
| 5,090,279 A * | 2/1992 | Enzinger | B23Q 11/0025 29/27 A |
| 5,220,224 A * | 6/1993 | Bosman | H02K 3/525 310/49.18 |
| 5,289,605 A * | 3/1994 | Armbruster | A47L 11/4005 15/230.14 |
| 5,342,153 A * | 8/1994 | Dobkins | B25H 1/0071 408/1 R |
| 5,415,503 A | 5/1995 | Strange et al. | |
| 5,560,108 A * | 10/1996 | Wilson | A01D 69/02 30/296.1 |
| 5,791,836 A * | 8/1998 | Feufel | B23Q 5/043 408/124 |
| 5,826,341 A * | 10/1998 | Massa | A01G 3/08 30/296.1 |
| 7,163,427 B1 * | 1/2007 | Lee | B63H 20/007 440/6 |
| 7,705,253 B2 * | 4/2010 | Krieger | D06F 37/42 200/500 |
| 9,168,591 B2 * | 10/2015 | Fischinger | B23B 39/00 |
| 9,259,791 B2 * | 2/2016 | Liao | B25H 1/005 |
| 9,833,842 B2 | 12/2017 | Gill | |
| 11,292,095 B2 * | 4/2022 | Feucht | B23Q 1/0009 |
| 2007/0197107 A1 * | 8/2007 | Lee | B63H 20/007 440/6 |
| 2007/0232159 A1 * | 10/2007 | Lee | B63H 20/007 440/63 |
| 2009/0095533 A1 * | 4/2009 | Amadei | E21B 41/0035 166/265 |
| 2010/0213679 A1 * | 8/2010 | Smith | B62B 3/10 280/727 |
| 2011/0033823 A1 * | 2/2011 | Gersh | A61C 17/20 433/119 |
| 2011/0204787 A1 * | 8/2011 | Schoen | H02K 21/16 310/67 R |
| 2012/0200170 A1 * | 8/2012 | Sabo | H02J 7/00302 307/104 |
| 2013/0133910 A1 * | 5/2013 | Riedl | H02K 11/026 310/72 |
| 2014/0302997 A1 * | 10/2014 | Takayasu | H01B 11/02 505/231 |
| 2015/0352713 A1 * | 12/2015 | Takazakura | B23B 37/00 173/2 |
| 2016/0317181 A1 * | 11/2016 | Kusleika | A61B 17/320783 |
| 2017/0361409 A1 * | 12/2017 | Feucht | H02J 50/10 |
| 2019/0314876 A1 * | 10/2019 | Oberle | H05B 1/0227 |
| 2021/0408863 A1 * | 12/2021 | Todd | B26B 19/284 |
| 2022/0059257 A1 * | 2/2022 | Gautard | H01F 3/06 |
| 2023/0076602 A1 * | 3/2023 | Hanna | E21B 7/025 |

* cited by examiner

ELECTRIC MOTOR POWER CORD FOR PORTABLE ELECTRICAL ASSEMBLY

CROSS-REFERENCE TO RELATED APPLICATIONS

The subject application claims priority to and all the benefits of U.S. Provisional Patent Application No. 62/967,364, filed on Jan. 29, 2020, the disclosure of which is hereby incorporated by reference.

TECHNICAL FIELD

The present invention relates, generally, to an electrical motor power cord for portable electrical assemblies, and, more specifically, to an electrical motor power cord that is coiled and hidden.

BACKGROUND

Portable electrical assemblies are utilized in many industries for a wide variety of uses. Such portable electrical assemblies typically include an electric motor that is used to allow the portable electrical assembly to perform a particular function. To transmit electrical power to such electric motors, an electric motor power cord is operably connected to the electric motor at first end and to an external power source at its second end. In portable electrical assemblies including a power module, or control box, that is used to control the operation of the electric motor, the electric motor power cord may be operatively connected to the electric motor at first end and to the power module at an second end, with a separate power cord operatively connected between the power module and an external power source at its second end. In many of these portable electrical assemblies, the electric motor power cord is located external to a portion of the portable electric assembly, such as a housing, that contains the electric motor and other associated components, such as the power module, and is thus accessible to a user.

Figure 1A:
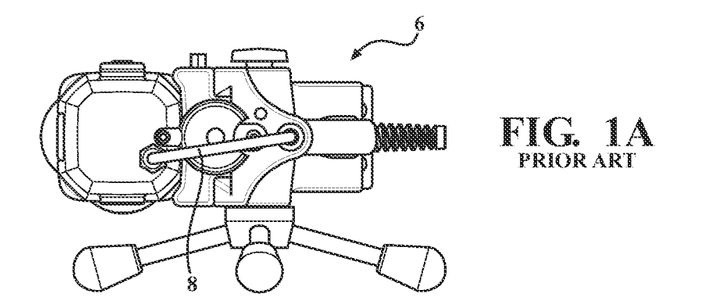
FIGS. 1A, 1B, and 1C are a front, top, and side view of a portable electrical assembly including an electric motor power cord located in a position accessible to a user in accordance with the prior art.
Figure 1B:
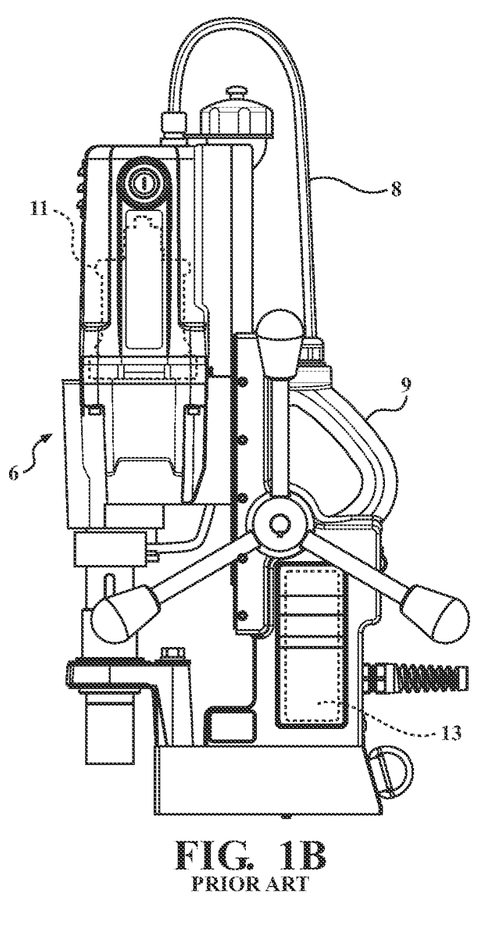
Figure 1C:
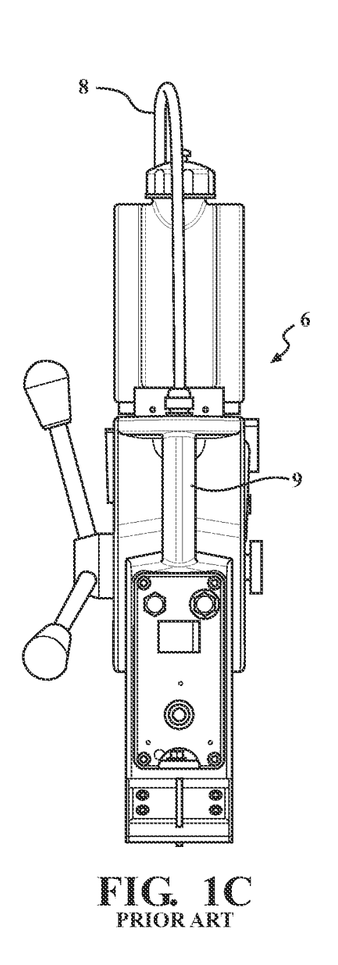
Figure 2:
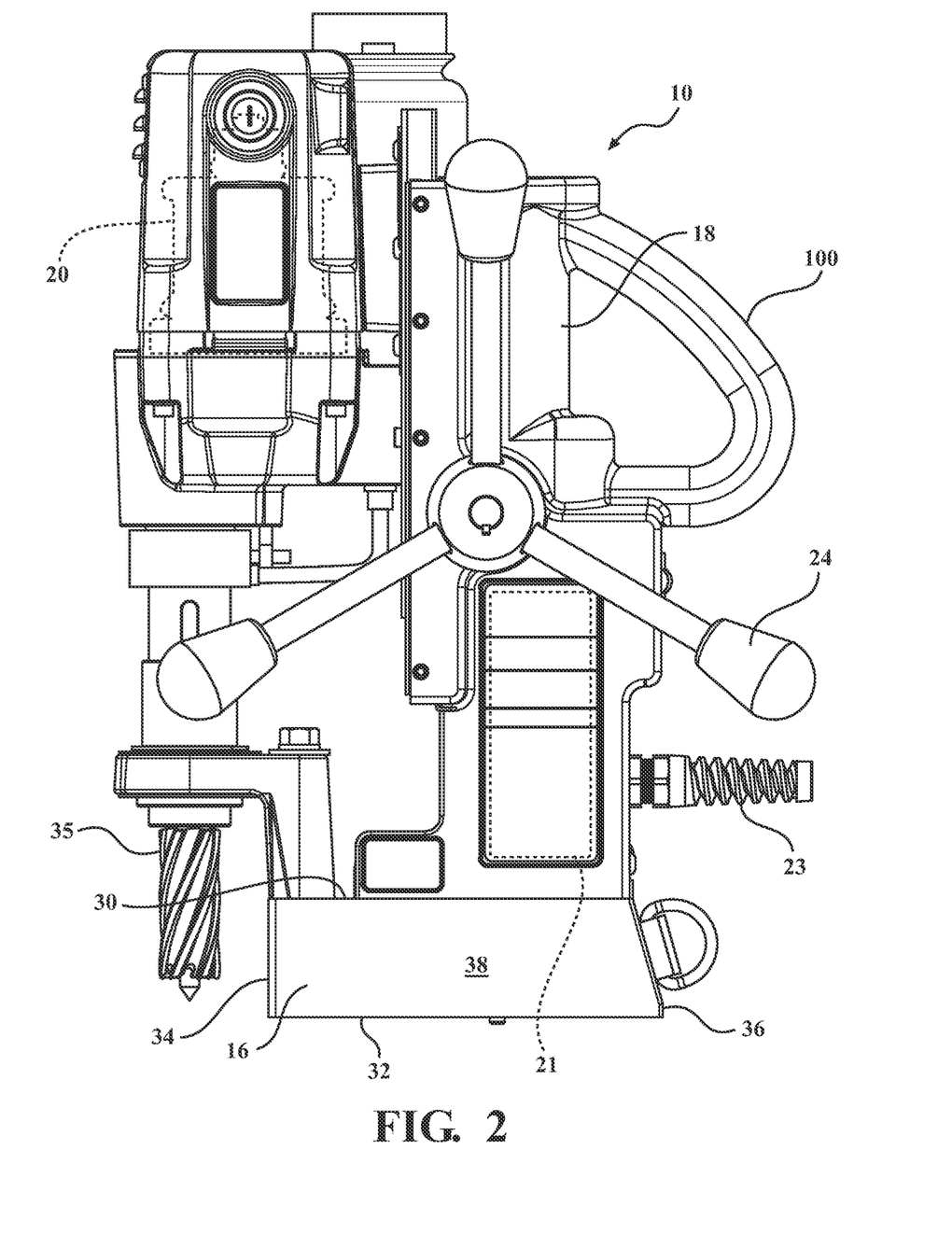
FIG. 2 is a front view of a portable electrical assembly according to one embodiment of the present invention.
Figure 3:
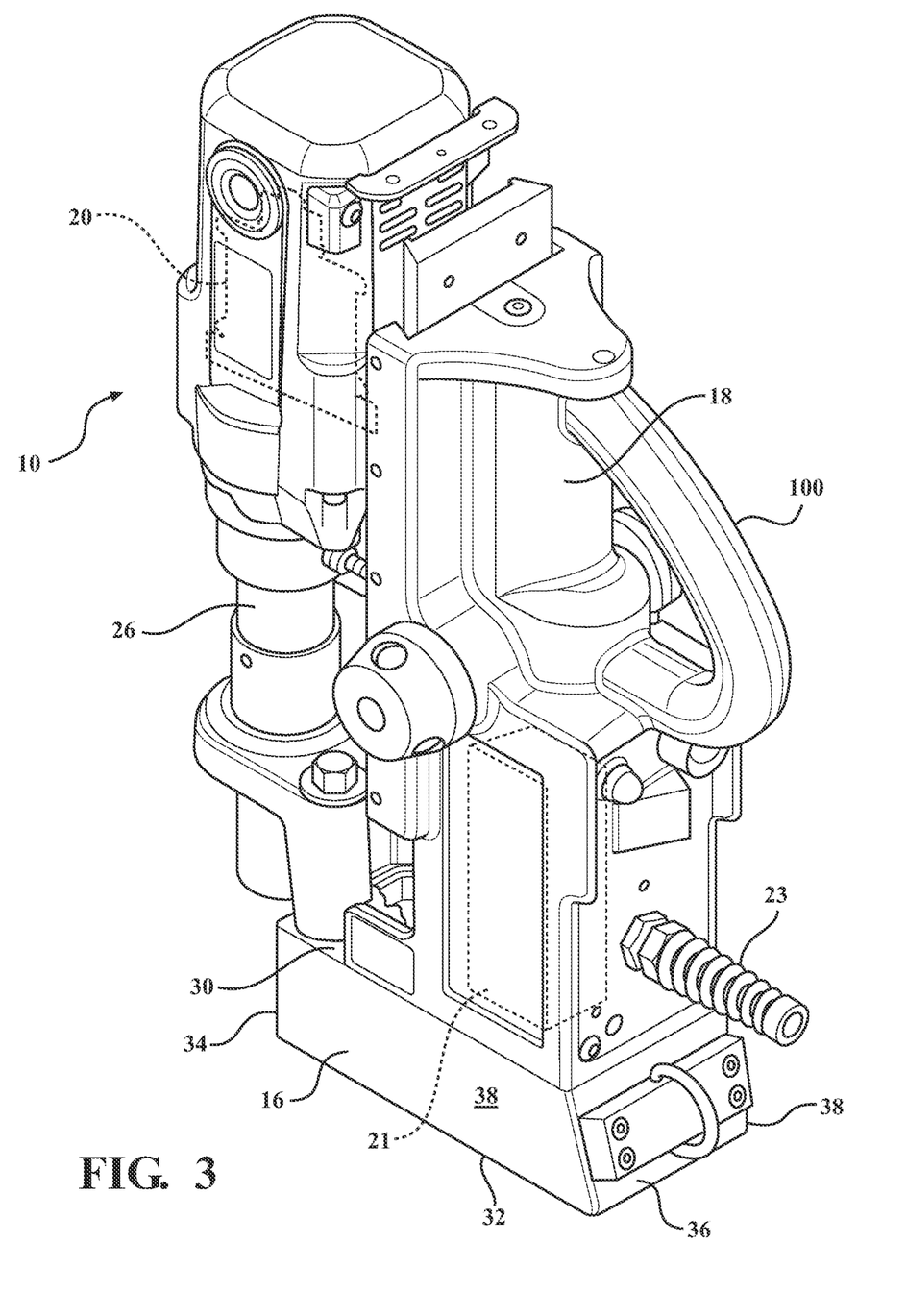
FIG. 3 is a rotated front perspective view of FIG. 2 with the cutter and a portion of the rotatable handle removed.

One example of a portable electrical assembly having such an external electric motor power cord is a magnetically mountable portable drill machine (i.e., a magdrill), which is used extensively in the metal fabricating field for forming holes in various working surfaces or workpieces supported on the working surfaces where it is either impractical or inconvenient to move the workpiece or the working surface to a conventional drill press. One representative embodiment of a magdrill in accordance with the prior art, as shown in FIGS. 1A-C and identified by reference numeral 6, includes an electric motor power cord 8 that operably connects its electric motor 11 to its power module 13 (each shown in phantom in FIG. 1B) and which is external to both the electric motor 11 and power module 13 and is therefore accessible to the user. Due to the strength and precision required to moveably support the entire electric motor and its associated components, the magdrill 6 as illustrated in FIGS. 1A-C is relatively bulky and difficult to maneuver along the workpiece or working surface for its intended use. Accordingly, the magdrill 6 is typically provided with handles 9 for aiding the user in carrying and positioning the magdrill 6 for its desired use. However, in many instances, the user will wrongly or mistakenly grab the electric motor power cord 8 and use it as the handle to carry the magdrill 6, which loosens the electric motor power cord 8 from its connection to the electric motor 11 or power module 13 and/or puts excessive strain on the electric motor power cord 8 which can cause the external power cord 8 to fail upon occasion.

To alleviate this concern, the electric motor power cord of some alternative portable electrical assemblies has been positioned within a portion of the portable electrical assembly in a location that is not accessible by the user, such as within a housing, when moving the respective portable electric assemblies (see, for example, U.S. Pat. No. 5,415,503 to Strange et. al). Typically, however, to accommodate the electric motor power cord within the housing of such portable electric assemblies such as in U.S. Pat. No. 5,415,503, it is necessary or common to position the electric motor power cord within its housing but with sharp bends along its length to maintain the connection between the electric motor and power module. Accordingly, during the advancement or retraction of the electric motor during normal operation of the portable electric assembly via a rectilinear movement of the electric motor relative to a stationary portion of the assembly and workpiece, the connected end of the electric motor power cord to the electric motor moves in response to the advancement or retraction of the electric motor. Such responsive movement of the connected end of the electric motor power cord may straighten or unstraighten the provided sharp bends in the electric motor power cord. Notably, the straightening and unstraightening of the electric motor power cord in response to the advancement or retraction of the electric motor during operation may cause excessive strain on the electric motor power cord associated with the straightening/unstraightening, which may also cause the electric motor power cord to fail upon occasion.

SUMMARY OF THE INVENTION

The present invention is directed to a portable electrical assembly that includes an electric motor, a power module, and an electric motor power cord. In particular, the portable electric assembly includes a housing including an outer side enclosure wall, an inner side enclosure wall spaced from the outer side enclosure wall, a top enclosure wall, and a bottom enclosure wall spaced from the top enclosure wall with the top enclosure wall and bottom enclosure wall defining a length along a central axis. The outer side enclosure wall, inner side enclosure wall, top enclosure wall and bottom enclosure wall also define a cavity. The portable electrical assembly also includes a power module coupled to the housing and an electric motor coupled to the housing and moveable relative to the power module between a plurality of operating positions including a resting position, an extended position, and one or more intermediate positions between the resting position and the extended position. The portable electrical assembly also includes an electric motor power cord contained within the cavity and operatively connected to the electric motor at a first end and to the power module at a second end opposite the first end. The electric motor power cord is circularly wrapped within the cavity about the central axis in a clockwise or counterclockwise direction to define a plurality of windings with the plurality of windings having a pitch defined by a distance measured along the central axis between an upper surface of an uppermost one of the plurality of windings and a lower surface of a lowermost one of the plurality of windings. The pitch of the plurality of windings have a maximum pitch when the electric motor is in the resting position. Conversely, the pitch of the plurality of windings have a minimum pitch when the electric motor is in the extended position, with the maximum pitch having a greater distance than the minimum pitch.

The electric motor power cord, in the form of a circularly coiled cord or in certain embodiments in the form of a helically coiled cord, expands or contracts within the cavity in response to the movement of the electric motor without the creation of sharp bends along its length as the electric motor moves between all of its possible operating positions.

By locating the electric motor power cord within the cavity of the housing in a location that is inaccessible to the user, the present invention prevents instances wherein a user wrongly or mistakenly grabs the electric motor power cord that is accessible to the user and uses it as the handle to carry the portable electrical assembly, which in turn minimizes or eliminates the resultant excessive strain and failure of the electric motor power cord associated therewith.

Further, the circular or helical wrapping of the electrical power cord within the housing also significantly increases the life of the electric motor power cord by eliminating excessive strain associated with the straightening/unstraightening of the sharp bends as compared with electric motor power cords placed within a housing of the portable electrical assembly but having or otherwise creating sharp bends along its length during movement of the electric motor in order to connect and maintain the connection between the electric motor and power module.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION

Referring now to FIGS. 2-10, wherein like numerals indicate corresponding parts throughout the several views, a portable electrical assembly, illustrated and described hereinafter in one exemplary embodiment as a drilling assembly or even more particularly as a magnetically mountable portable drill machine ("magdrill"), is shown generally at 10.

While the description of the portable electrical assembly 10 below is directed to a magdrill 10 for ease of description, the arrangement of the inventive elements described herein is equally applicable to a wide variety of other types of portable electrical assemblies 10 other than a magdrill 10 that include an electric motor power cord operatively connected between an electric motor and a power module as described below. Accordingly, the magdrill 10 described in FIGS. 2-10 represents one exemplary type of portable electrical machine 10 in accordance with the present invention. Notably, other exemplary portable electrical assemblies in which the electric motor and operatively connected electric motor power cord are moveable within a cavity of a housing during operation are contemplated. A non-limiting list of such portable electrical assemblies includes hole punchers, paint shakers, vac-pads, ratchet drives, grinders, power saws, impact wrenches, screwdrivers, impact drivers, jackhammers, portable sanders, portable welders and the like.

The magdrill 10 in accordance with one exemplary embodiment is configured to mount to a working surface (not shown). The working surface may be any suitable shape, such as a rectangular shape and is typically made of a ferromagnetic material such as steel. The magdrill 10 is mounted and secured to the working surface by magnetic attraction therebetween. The magdrill 10 may also alternatively be mounted or otherwise secured to the working surface with a clamp or through the use of a vacuum assist. Still further, the magdrill may be mounted or secured to the working surface by magnetic attraction in combination clamping and/or vacuum assist. It should be appreciated that the working surface may be a workpiece, or the workpiece may be supported on the working surface. It should also be appreciated that the working surface is not intended to limit the scope of the present invention. It should further be appreciated that the magdrill 10 may be used with various other types of working surfaces without departing from the scope of the present invention.

Referring to FIGS. 2-10, the magdrill 10 includes a magnetic base 16 for magnetically engaging the working surface and a support platform, or housing 18, mounted to the magnetic base 16. The magdrill 10 includes an electric motor 20 coupled to the housing 18. As also best shown in FIGS. 6-9, the magdrill 10 includes an electric motor power cord 19 disposed within a cavity 50 of the housing 18 and electrically connected to the electric motor 20 at first end 19A (i.e., the first end 19A) and to a stationary power module 21, or control box 21, at its second end 19B (i.e., second end 19B. The magdrill 10 also includes a second electrical power cord 23 connected to the power module 21 and extending externally to connect to a power source such as an AC power source (not shown). The AC power source may be a conventional 120V or 240V power source. The magdrill 10 typically also includes a control switch (not shown) connected to the power module 21 to control the supply of power to the electric motor 20 from the power module 21 through the electric motor power cord 19.

Figures 6, 10:
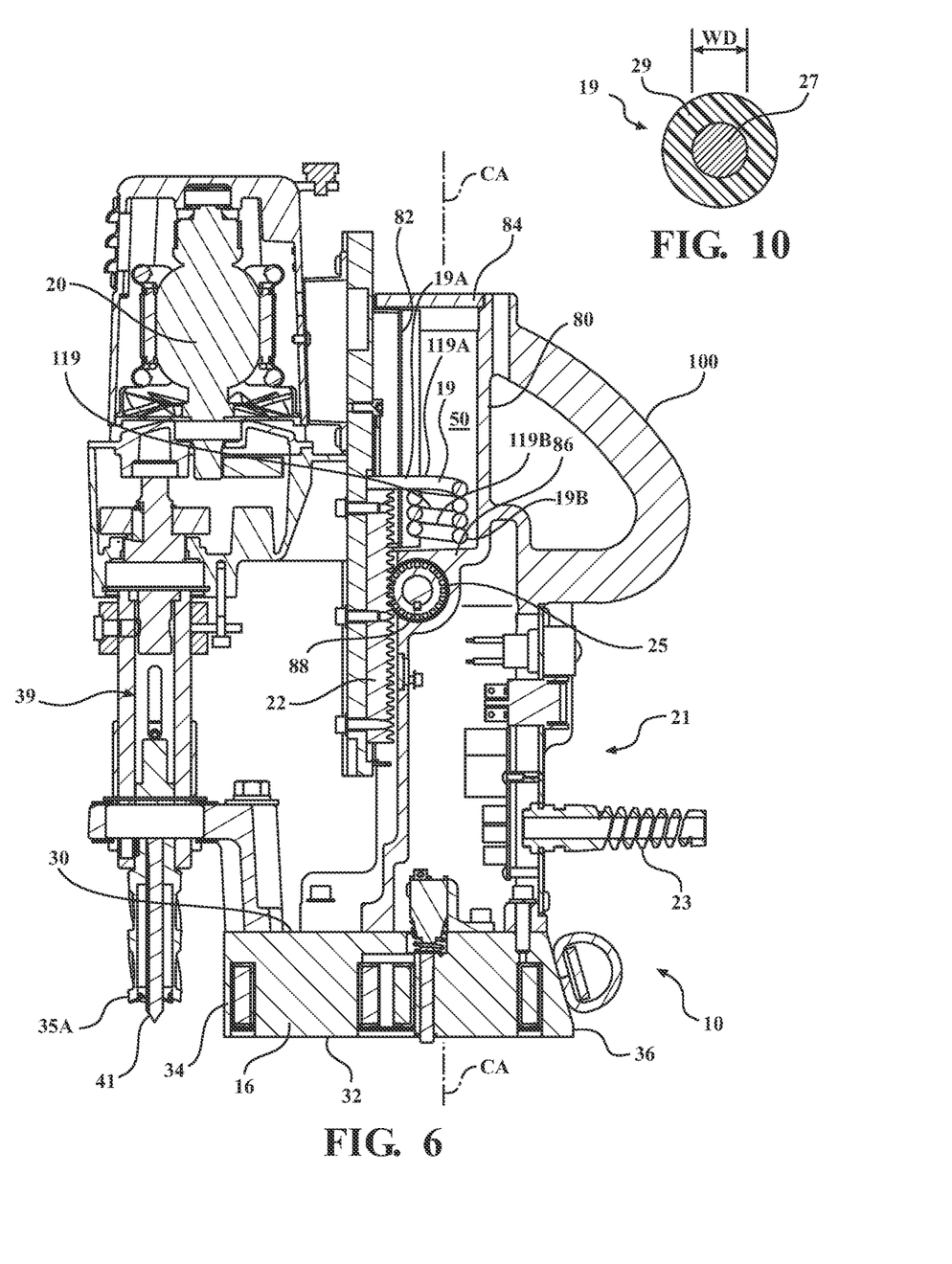
FIG. 6 is a partial sectional view of FIG. 2.
FIG. 10 is a section view of the electric motor power cord used in the portable electrical assembly of FIGS. 2-9.

The electric power cord 19 extends in length between the first end 19A and a second end 19B includes an electrical wire 27 contained within an insulated cover 29 (see FIG. 10). The electrical wire 27, in cross-section as shown in FIG. 10, is generally circular and has a particular size or wire diameter WD that determines the amount of electric current a wire can safely carry, as well as its electrical resistance and weight. The electrical wire 27 can also be described as having a particular wire gauge, with the wire gauge number increasing as the wire diameter WD decreases. The wire gauge of the electrical wire 27 is typically expressed as a number according to the American wire gauge (AWG), also known as the Brown & Sharpe wire gauge. For example, a 16 gauge electrical wire 27 (i.e., a 16 AWG, which carries 16 amps of current) has a cross-sectional diameter of 0.0508 inches, which is slightly smaller than a 14 gauge wire (i.e., a 14 AWG, which carries 14 amps of current), which has a cross-sectional area of 0.0641 inches). The wire gauge of the electrical wire 27 utilized in the magdrill 10, in accordance with the exemplary embodiments, may vary based upon numerous factors, as will be further described below.

As best shown in FIGS. 6-9, the magdrill 10 includes a slide assembly 22 coupled to the electric motor 20 and the housing 18 and a gear 25 rotatably coupled to the housing 18 to engage the slide assembly 22 for rectilinear movement (i.e., an axial movement) of the electric motor 20 relative to a stationary portion of the assembly 10 and workpiece during operation to cut or drill a hole in the workpiece, as will be described further below. The magdrill 10 further includes a rotatable handle 24 (see FIGS. 2, 4 and 5) coupled to the gear 25 that is actuated by a user to rotate the gear 25 and actuate (i.e., axially move) the electric motor 20 between all of its possible operating positions (i.e., between a plurality of operating positions) which includes an extended position and a resting position and one or more intermediate operating positions between the extended position and resting position (as will be described further below as well). It should be appreciated that the slide assembly 22, gear 25, and the rotatable handle 24 are conventional and known in the art.

The magdrill 10 further includes an arbor 26 coupled to the electric motor 20 for rotation by the electric motor 20. The arbor 26 defines a bore (shown by arrow 39 in FIGS. 6-9). The magdrill 10 includes a cutter 35 having an upper end partially inserted into the bore 39 and coupled to the arbor 26. The cutter 35 partially extends from the bore 39 to a lower cutting end for cutting (i.e., drilling) the workpiece or working surface, which is typically formed from a rigid material such as metal. The lower cutting end 35A may have a pilot 41 extending axially therefrom. The cutter 35 rotates with the arbor 26 relative to the housing 18 to cut (i.e., drill) a hole in the workpiece or working surface. For example, the cutter 35 is sized to cut holes sized between 7/16-3¹/16 inches in diameter or more and 1-3 inches in depth or more. It should be appreciated that the size of the holes can be any size without departing from the nature of the present invention.

As noted above, and as shown in FIGS. 6-9, the housing 18 also includes a cavity 50 that is defined between an outer side enclosure wall 80, an inner side enclosure wall 82, a top enclosure wall 84, and a bottom enclosure wall 86. The terms "outer" as in "outer side", "inner" as in "inner side", "bottom" and "top" are relative terms to describe and distinguish the respective enclosure walls 80, 82 84, 86 correspond to the viewpoint as illustrated in the representative FIGS. 2-9 and correspond to the general orientation of the portable electrical assembly 10 during typical usage by an operator, with the magnetic base 16 coupled against a flat and horizontally workpiece during operation. However, the terms "outer", "inner", "bottom" and "top" are not intended to limit the portable electrical assembly 10 to this absolute orientation.

The width w of the cavity 50 (see FIG. 7) is defined between the interior surface of the outer and inner side enclosure walls 80, 82 in a direction normal to a central axis CA, while the length l of the cavity 50 (also see FIG. 7) is defined between the top and bottom enclosure walls 84, 86 in a direction along the central axis CA. The central axis CA (see FIGS. 6-9) is generally defined as a line extending in a direction parallel to the outer and inner side enclosure walls 80, 82 and is midway between the outer and inner side enclosure walls 80, 82. The width w and length l of the cavity 50 are designed to accommodate the electric motor power cord 19 and allow the electric motor power cord 19 to move in conjunction with the movement of the electric motor 20 without the creation of sharp bends along its length, as will be explained in further detail below.

The inner side enclosure wall 82 defines a slot opening (not shown) through which the first end 19A of the electric motor power cord 19 is electrically coupled to the electric motor 20. The electrical coupling of the first end 19A to the electric motor 20 is not limited, and may be through a wire coupling, a connector, or through a physical connection formed by soldering, crimping or welding. The exterior surface of the inner side enclosure wall 82 is adjacent to, but spaced from, the slide assembly 22 when the slide assembly 22 is in the resting position.

The bottom enclosure wall 86 is coupled to, affixed to, or otherwise integrally formed with, a power module housing 90 containing the power module 21. Still further, the bottom enclosure wall 86 and the power module housing 90 define a coextensive opening (not shown) through which the second end 19B of the electric motor power cord 19 is electrically coupled to the power module 21. The electrically coupling of the second end 19B to the power module 21 is not limited, and may be through a wire coupling, a connector, or through a physical connection formed by soldering, crimping or welding. The bottom enclosure wall 86 also includes an inlet 88 distinct from the cavity 50 for partially containing the gear 25 while allowing the gear 25 to rotate and engage the slide assembly 22 for rectilinear movement of the electric motor 20, as noted above.

Figure 4:
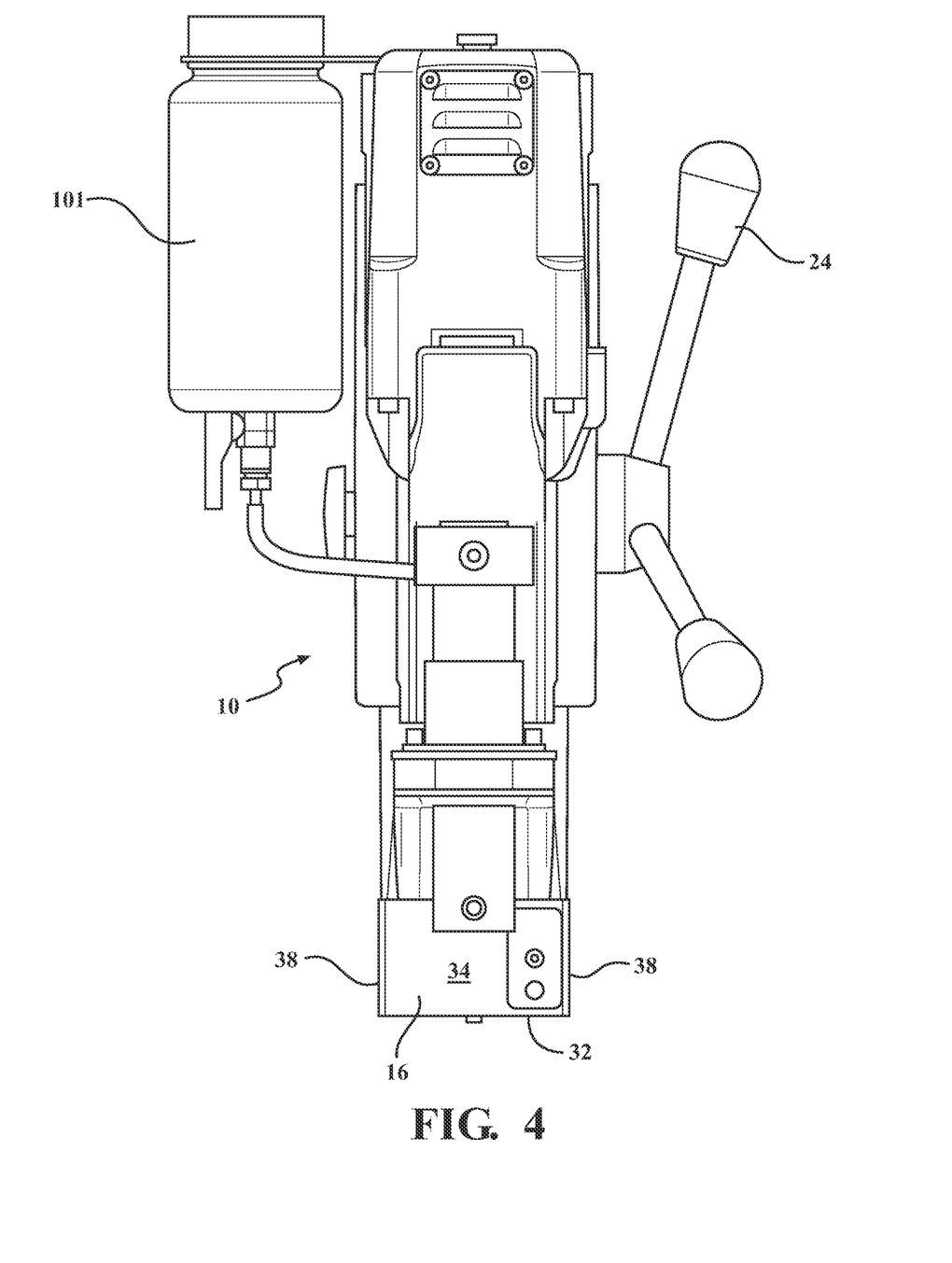
FIG. 4 is a left side view of FIG. 2 with the cutter removed.
Figure 5:
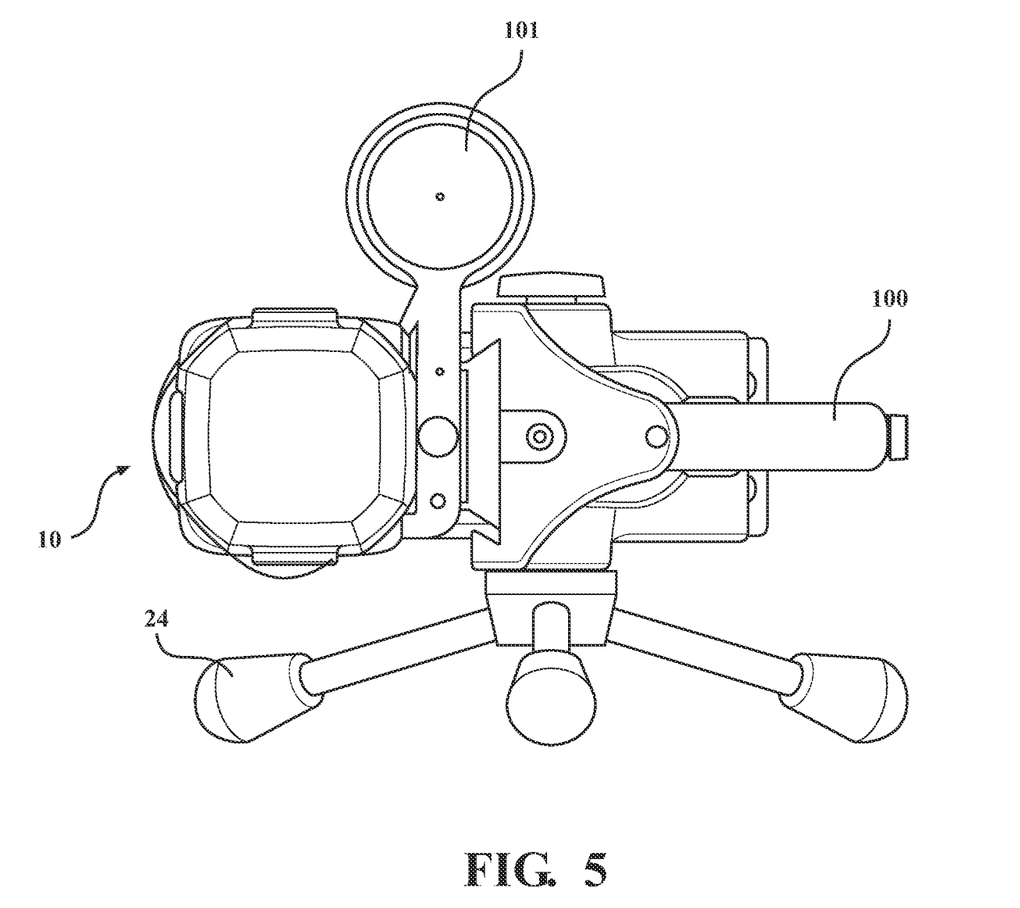
FIG. 5 is a top view of FIG. 2.

In certain embodiments, such as shown in FIGS. 2, 3 and 5-9, a gripping handle 100 is coupled to an exterior surface of the outer side enclosure wall 80 of the housing 18. The gripping handle 100 is configured to be easily gripped by a user when holding, moving or otherwise positioning the magdrill 10 between uses. Further, because the gripping handle 100 is located on the exterior of the housing 18 and is separated from the electric motor power cord 19 (which is contained within the cavity 50 of the housing 18 and not accessible to the user while attempting to grip the gripping handle 100), the possibility that a user may inadvertently or mistakenly damage the electric motor power cord 19 or strain the electric motor power cord 19 why attempting to grab the gripping handle 100, or while otherwise attempting to move the magdrill 10, is eliminated. A fluid reservoir 101 is also illustrated in FIGS. 4 and 5 that is used to provide a fluid, such as a hydraulic fluid or oil, to cool various components of the magdrill 10 during a cutting operation.

The magnetic base 16 is generally rectangular in shape but may be any suitable shape for securing the magdrill 10 to the working piece during use. The magnetic base 16 has a top surface 30, a bottom surface 32 opposing the top surface 30, a front surface 34 extending between the top surface 30 and bottom surface 32, a rear surface 36 opposing the front surface 34 and extending between the top surface 30 and bottom surface 32, and opposed side surfaces 38 extending between the top surface 30 and bottom surface 32 and between the front surface 34 and rear surface 36. The magnetic base 16 also has a chamber (not shown) extending upwardly or inwardly from the bottom surface 32. The magnetic base 16 also includes a winding assembly (not shown) to generate a magnetic field. The winding assembly includes at least one winding (not shown) disposed in the chamber. This winding is also sometimes referred to as a copper bobbin. The magnetic base 16 also includes at least one wire (not shown) for powering the winding assembly. The wire is disposed in the chamber and connected to the winding and extends through an aperture in the top surface 30 for electrically connecting the magnetic base 16 to the housing 18 to receive power from the power module 21 within the housing 18. The magnetic base 16 is solid and made of a non-magnetic material. The magnetic base 16 is typically integral, unitary, and one-piece. It should be appreciated that the winding assembly may be electrically connected to the control switch or another source of power other than the power module 21. It should also be appreciated that the magnetic base 16 may include one or more apertures for wires or fasteners. It should further be appreciated that, when the winding assembly receives power, the magnetic base 16 is magnetized to mount and secure the magdrill 10 to the working surface via a magnetic field generated by the winding assembly.

Figure 7:
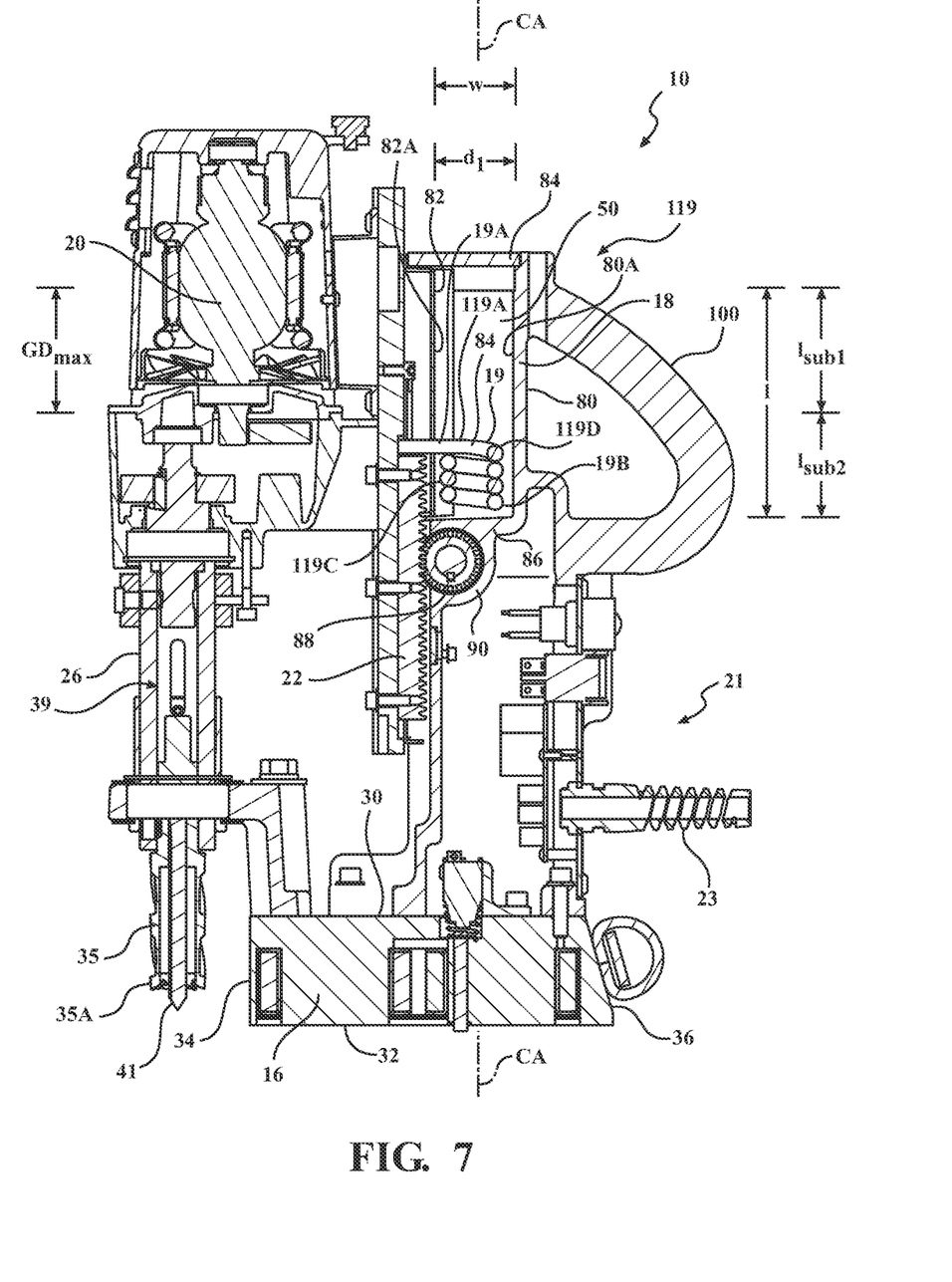
FIG. 7 is a section view of FIG. 2 with the electric motor in an extended position and the electric motor power cord in a contracted state.
Figure 8:
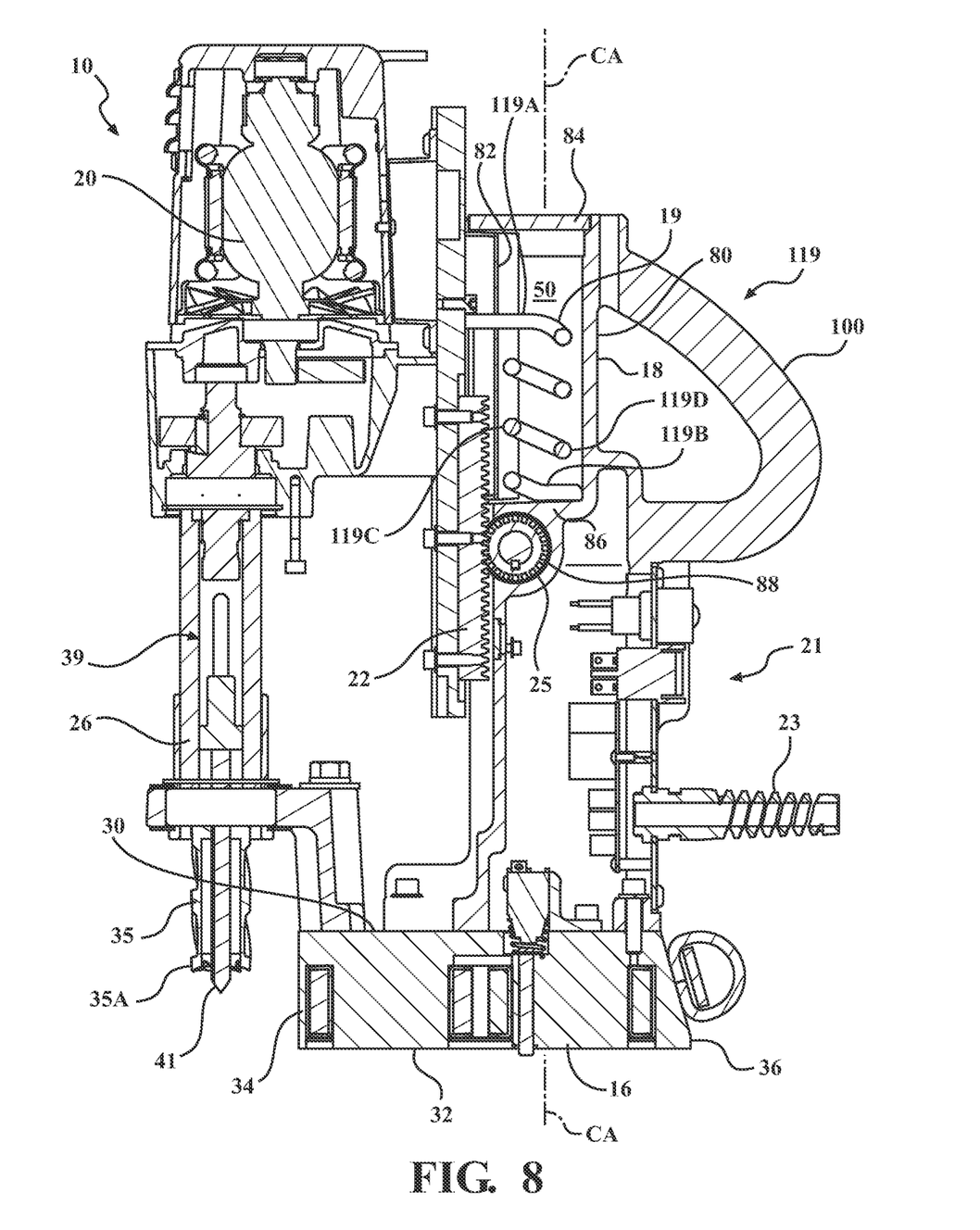
FIG. 8 is a section view of FIG. 2 with the electric motor in an intermediate position and the electric motor power cord in a partially expanded state.

In operation, the magdrill 10 is disposed on the working surface (not shown). The user operates the control switch to provide power to the winding assembly to generate a magnetic field to magnetically mount and secure the magdrill 10 to the working surface. The electric motor 20 rotates about a drive axis and rotates the arbor 26. At the same time, the arbor 26 causes the cutter 35 to rotate. The slide assembly 22 is in a raised or retracted position (i.e., a resting position—see FIG. 9), as is the electric motor 20, arbor 26, and cutter 35 coupled to the electric motor 20. The rotatable handle 24 is actuated by a user to rotate the gear 25 and move (such as by lowering, and typically more specifically by vertically lowering) the electric motor 20, arbor 26, and cutter 35 toward the working surface from the resting position through a plurality of intermediate positions to an extended position (the extended position is shown in FIGS. 6 and 7, and one of the intermediate positions is shown in FIG. 8) to cut or drill a hole in the workpiece or working surface. The rotatable handle 24 can then be actuated to move (such as by raising, and typically more specifically by vertically raising) the electric motor 20, arbor 26, and cutter 35 away from the working surface from the extended position through a plurality of intermediate positions to the resting position after completion of the cutting or drilling of the hole in the workpiece or working surface.

The moving of the electric motor 20 between all of its possible operating positions including the resting and extended position and each of the plurality of intermediate positions as described above, in turn, causes the corresponding associated movement of the connected first end 19A of the electric motor power cord 19 within the cavity 50 of the housing 18 in response in order to remain electrically coupled to the electric motor 20. At the same time, the second end 19B of the electric motor power cord 19 remains generally fixed in location within the cavity 50 in close proximity to the bottom enclosure wall 86 of the housing 18 and remains electrically coupled to the power module 21. The movement of the electric motor power cord 19 within the cavity 50 in accordance with the present invention, as noted above, occurs without the creation of sharp bends of the electrical power cord 19 along its length as the electric motor 20 of the magdrill 10 moves between all of its possible operating positions. Further, the length l of the cavity 50, and more in particular a first sub-length $l_{sub1}$ (see FIG. 7) of the cavity 50, is sufficient to accommodate the entire length movement of the connected first end 19A of the electric motor power cord 19 as the electric motor 20 moves from the resting position to the extended position.

To address the issue of the elimination of sharp bends in the electric motor power cord 19 as the electric motor 20 moves between all of its possible operating positions, in one embodiment of the present invention, as best illustrated in FIGS. 6-9, the electric motor power cord 19 is in the form of a circularly coiled cord 19, in which the cord 19 is circularly wrapped, and preferably helically wrapped, in a clockwise or counterclockwise direction to define a plurality of windings 119 and is contained within a cavity 50 of the housing 18. The configuration of the circular or helical wrapping of the plurality of windings 119 of the circularly coiled cord 19 is such that no sharp bends are present along any portion of the length of the circularly coiled cord 19 along the entire length of its movement during operation of the electric motor 20 of the magdrill 10 from the extended position to the resting position (and including both the extended and resting position) and through each one of the intermediate positions between the extended and resting positions. The number of windings 119 can vary from one winding 119 to more than one winding (i.e., the plurality of windings 119 such as shown in FIGS. 6-9), with each 360-degree turn about the central axis CA along the portion of the length of the circularly coiled cord 19 defining a single winding 119 of the plurality of windings 119 within the cavity 50. The circularly coiled cord 19, as shown in FIGS. 6-9 in one embodiment, includes four windings 119, although the number of the plurality of windings 119 may be more or less than four, with the upper limit of the number of windings 119 limited by the thickness of the circularly coiled cord 19 and by the length l of the cavity 50.

The circular nature of the circularly coiled cord 19 is also such that the radially outward surface 119C, 119D of each winding 119 (with the radially outward surface 119D adjacent to outer side enclosure wall 80 and the radially outward surface 119C adjacent to the inner side enclosure wall 82) respectively and collectively defining an outer diameter d1 of the circularly coiled cord 19 about the central axis CA (see FIG. 7), with the outer diameter d1 measured by a line extending normal to each of the outer side enclosure wall 80 and the inner side enclosure wall 82 and through the central axis CA. This outer diameter d1, in certain embodiments, is slightly less than the width w of the cavity 50 (also shown in FIG. 7), with the width w measured by a line extending normal to each of the outer side enclosure wall 80 and the inner side enclosure wall 82 and through the central axis CA and measured from the inner surfaces 80A, 82A of the respective outer side enclosure wall 80 and the inner side enclosure wall 82, and thus the radially outward surface 119C, 119D of each winding 119 of the circularly coiled cord 19 is radially inward of the respective inner surfaces 80A, 82A of the outer and inner side enclosure walls 80 and 82.

In this embodiment, the circularly coiled cord 19 expands (see the expanded state of FIG. 9) or contracts (see the contracted state of FIG. 7), or is placed into a partially expanded state (see FIG. 8) between the expanded and contracted state, in response to the movement of the electric motor 20 without the creation of sharp bends along its length as the electric motor 20 moves between all of its possible operating positions (including the extended position, the resting position, and each of the plurality of intermediate positions between the extended and resting position).

Figure 9:
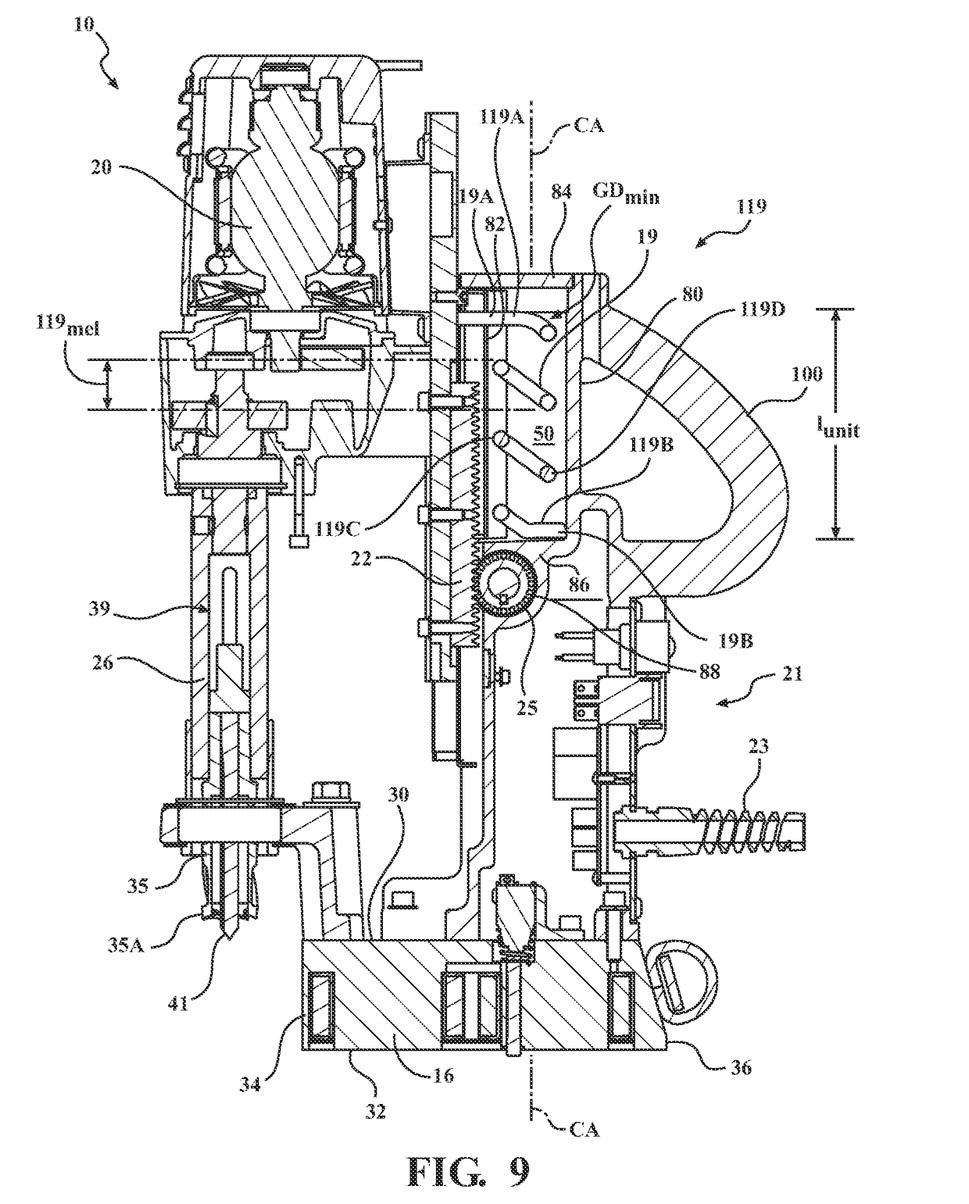
FIG. 9 is a section view of FIG. 2 with the electric motor in a resting position and the electric motor power cord in an expanded state.

In the expanded state, corresponding to the resting position of the electric motor 20 and as shown in FIG. 9, the uppermost one 119A of the windings 119 is brought into a minimum gap distance $GD_{min}$, such as in close proximity or contact with, the top enclosure wall 84 as a result of the movement of the first end 19A of the circularly coiled cord 19 to maintain connection to the electric motor 20, while the lowermost one 119B of the windings 119 remains adjacent to the lower enclosure wall 86. In other words, the uppermost one 119A of the windings 119 is at a minimum gap distance $GD_{min}$ along the length from said top enclosure wall 84. As shown in FIG. 9, the uppermost one 119A of the windings 119 is brought into contact with the top enclosure wall 84, and thus the minimum gap distance $GD_{min}$ is zero ($GD_{min}$ is thus illustrated by an arrow in FIG. 9). However, in related embodiments, the uppermost one 119A of the windings 119 may be adjacent to, but not in contact with, the top enclosure wall 84, and thus the minimum gap distance $GD_{min}$ is greater than zero.

Accordingly, the pitch of the plurality of windings 119 of the circularly coiled cord 19, defined by a distance measured along the central axis CA between an upper surface of an uppermost one 119A of the plurality of windings 119 and a lower surface of a lowermost one 119B of the plurality of windings 119, is maximized. Stated another way, the pitch of the plurality of windings 119 have a maximum pitch when the circularly coiled cord 19 is in the expanded state, corresponding to when the electric motor 20 is in the resting position. Accordingly, the minimum gap distance $GD_{min}$ corresponds to the maximum pitch of the plurality of windings 119. Still further, the number of windings 119 per unit length $l_{unit}$, (see FIG. 9) measured in a direction corresponding to the length l of the cavity 50, is minimized.

In the contracted state, corresponding to the extended position of the electric motor 20 and as shown in FIG. 7, the uppermost one 119A of the windings 119 of the circularly coiled cord 19 is brought into closer proximity with the lower enclosure wall 86 than in the expanded state shown in FIG. 9 as a result of the movement of the first end 19A of the cord 19 to maintain connection to the electric motor 20, while the lowermost one of the windings 119 remains adjacent to the lower enclosure wall 86. In other words, the uppermost one 119A of the windings 119 is at a maximum gap distance $GD_{max}$ (see FIG. 7) along the length from said top enclosure wall 84. In this contracted state, the outer surface of one adjacent one of the windings 119 is brought into close proximity, or contact, with the next adjacent one of the windings 119. Accordingly, the pitch of the plurality of windings 119 is minimized. Stated another way, the pitch of the plurality of windings 119 have a minimum pitch in the contracted state, corresponding to the extended position of the electric motor 20. Still further, the number of windings 119 per unit length $l_{unit}$, measured in a direction corresponding to the length l of the cavity 50, is maximized. Still further, the maximum gap distance $GD_{max}$ corresponds to the minimum pitch of the plurality of windings 119 and also corresponds in distance to the first sub-length $l_{sub1}$ of the cavity 50.

In the partially expanded state (or partially contracted state), corresponding to one of the intermediate positions of the electric motor 20 between the resting position and extended position and as shown in FIG. 8, the uppermost one 119A of the windings 119 of the circularly coiled cord 19 is brought into closer proximity with the lower enclosure wall 86 and further proximity from the top enclosure wall 84, as a result of the movement of the first end 19A of the cord 19 to maintain connection to the electric motor 20. In this partially expanded state, the uppermost one 119A of the windings 119 is located further from the top enclosure wall 84 as compared to the positioning of the uppermost one 119A of the windings 119 in the expanded state of FIG. 9, but is located closer to the top enclosure wall 84 as compared to the positioning of the uppermost one 119A of the windings 119 in the contracted state of FIG. 7. However, om the partially expanded state of FIG. 8, and similar to both FIGS. 7 and 9, the lowermost one 119B of the windings 119 remains adjacent to the lower enclosure wall 86. In this partially expanded state, the outer surface of one adjacent one of the windings 119 is brought into closer proximity, but not in contact with, with the next adjacent one of the windings 119. Accordingly, the pitch of the plurality of windings 119 is between the maximum and minimum pitch in the partially expanded state.

Notably, the expansion or contraction of the windings 119 of the circularly coiled cord 19 between any two operating positions does not create any sharp bends or straightening of the plurality of windings 119 of the circularly coiled cord 19 during such expanding or contracting movement, and thus excessive strain on the circularly coiled cord 19 associated with the straightening and unstraightening (i.e., creation or alleviation of sharp bends) of the circularly coiled coil 19 during operation of the electric motor 20 during operation of the magdrill 10 is minimized or eliminated. In particular, the electrical power cord 19 remains in the circularly or helically wrapped state, and in certain embodiments remains in the circularly or helically wrapped state such that the outer diameter d1 of each one of the plurality of windings 119 remains essentially constant, or constant, whether the electric motor 20 in each of the operating positions, whether the electric motor 20 is in the extended position, the resting position, or in any intermediate position between the extended and resting position, with the maintained wrapping of the windings 119. Stated yet another way, the plurality of windings 119 of the electrical power cord 19 remain circularly coiled, such as helically coiled, within the cavity 50 as the electric motor 20 moves between each one of said plurality of operating positions. This minimization or elimination of excessive strain on the circularly coiled electrical power cord 19, which may lead to circularly coiled cord 19 failure, can therefore result in increased life of the circularly coiled cord 19 and magdrill 10 without the need for repair or replacement of the circularly coiled cord 19.

To accommodate this movement of the electric motor 20 to the resting position, as shown in FIG. 9 after movement from the extended position as shown in FIG. 7, the first sub-length $l_{sub1}$ of the cavity 50 must be sufficiently long to accommodate the entire length movement of the uppermost one 119A of the windings 119 within the cavity 50 as the electric motor 20 moves from the resting position to the extended position. The first sub-length $l_{sub1}$ is the distance between the upper surface of the uppermost one 119A of the windings 119 and the inner surface of the top enclosure wall 84 when the electric motor 20 is in the resting position and is measured accordingly when the windings 119 have the maximum pitch, with the inner surface of the top enclosure wall 84 therefore further defining the upper terminus of the cavity 50.

The remaining sub-length of the cavity 50, or second sub-length $l_{sub2}$, is the distance measured between the upper surface of the uppermost one 119A of the windings 119 and the inner surface of the bottom enclosure wall 86 when the electric motor 20 is in the resting position, with the sum total of the first sub-length $l_{sub1}$ and the second sub-length $l_{sub2}$ being equal to the length l of the cavity 50.

The respective lengths of each of the first sub-length $l_{sub1}$ and the second sub-length $l_{sub2}$ (and in conjunction therewith the total length l of the cavity 50) are dependent upon the interrelated factors of the relative amount of rectilinear movement of the electric motor 20 between and including the resting and extended position, in combination with the gauge of the electrical wire 27, and further in combination with the number of windings 119 of the electric motor power cord 19 utilized to power the electric motor 20 to allow the magdrill 10 to drill holes to the desired maximum drilling length.

The relative amount of rectilinear movement of the electric motor 20, also sometimes alternatively referred to as a machine stroke, is directly related to the maximum allowable drilling length of the magdrill 10 within, or through, a workpiece or working surface.

For a 2-inch magdrill 10, by way of one example, the maximum allowable drilling length is not simply 2 inches corresponding to the length of the cut through the workpiece and to the general conventional description of the magdrill 10, but generally incorporates other known factors related to the configuration of conventional magdrills 10. In particular, the regrind length, pilot projection length, and the pilot clearance (i.e., the distance between the coupled pilot 41 and the workpiece prior to drilling into the workpiece) are also factored into the rectilinear movement of the electric motor 20 during a machine stroke. Still further, the maximum allowable drilling length also optionally factors in an additional length to compensate for any length that may be lost as a result of sharpening the cutter 35 after any usage or usages. Accordingly, by way of one non-limiting example, a 2-inch magdrill 10 such as the one illustrated in the FIGS. factors in a ¼-inch regrind length, a ⅜-inch pilot projection length, and a 9/32-inch pilot clearance length, in addition to the depth of cut through a 2-inch thick workpiece, for a total of 2 and 29/32 inches of maximum allowable length of the rectilinear movement of the electric motor 20 of a 2-inch magdrill 10 during a machine stroke (plus optionally the additional length to compensate for any length that may be lost as a result of sharpening the cutter 35 after any usage or usages). However, each individual compensation length, and the total compensation length, may vary by the drill size (i.e., a 2-inch magdrill vs. a 3-inch magdrill) or by manufacturer or other factors and is not limited to the description herein.

In association therewith, the first sub-length $l_{sub1}$ must be sufficiently long and sized to correspond to the maximum allowable length of the rectilinear movement of the electric motor 20 corresponding to the particular size of the magdrill 10 utilized. Stated another way, the first sub-length $l_{sub1}$ must be at least as long, and preferably slightly longer than, the maximum allowable length of the rectilinear movement of the electric motor 20 corresponding to the particular size of the magdrill 10 utilized. By way of example, for the representative 2-inch magdrill 10 as described above, the first sub-length $l_{sub1}$ is at least 2 and 29/32 inches, and more preferably slightly longer than 2 and 29/32 inches, such as about 3 inches.

The second sub-length $l_{sub2}$ is also dependent upon the gauge of the electrical wire 27 used in the power cord 19, the number of windings of the power cord 19 contained in the cavity 50, and the associated flexing requirements for the electrical wire 27 based upon the gauge of the electrical wire 27 utilized and the number of windings. These additional dependencies thus adjust the relative requirements for the first sub-length $l_{sub1}$ and the second sub-length $l_{sub2}$ beyond what is required based upon the rectilinear movement of the electric motor 20 between the resting and extended position.

In general, the larger the horsepower requirements of the electric motor 20, as dictated by the size of the magdrill 10 (i.e., with a larger magdrill 10 (3-inch magdrill vs. a 2-inch magdrill, for example) typically requiring more horsepower), the larger the amperage (i.e., amps) of current needed to power the electric motor 20 during operation. To accommodate this larger amperage requirement, a larger gauge wire is utilized, which has a smaller cross-sectional diameter. Conversely, for smaller magdrills 10 utilizing less horsepower, a smaller gauge electrical wire 27 is typically utilized, which has a larger cross-sectional wire diameter WD. Accordingly, depending upon the gauge of the electrical wire 27 utilized in a particular magdrill 10, and assuming an equal number of windings and equal thickness of the insulating cover 29, the second sub-length $l_{sub2}$ is adjusted slightly higher for smaller gauge electrical wires 27 and slightly lower for higher gauge electrical wires 27 to accommodate the associated cross-sectional wire diameter WD differences of the electrical wire 27 having these different gauges.

Still further, in certain embodiments, the number of windings 119 of the plurality of windings 119 can also be varied, which is therefore related to the length of the second sub-length $l_{sub2}$ within the cavity 50. In particular, as the number of windings 119 increases for the electrical power cord 19 contained within the cavity 50, the length of the second sub-length $l_{sub2}$ correspondingly increases within the cavity 50. The number of windings 119 for the electrical power cord 19 is determined such that the maximum extended length $119_{mel}$ (see FIG. 9) of any one respective winding 119 (see FIGS. 6-8) does not exceed the maximum allowable extended length per winding 119 according to the manufacturer's recommendation for power cords having a particular coil configuration utilizing a particular gauge electrical wire 27.

The present invention provides practical and simple solutions for increasing the life of portable electrical assemblies as compared to portable electric assemblies, such as magdrills, that include an electric motor power cord located external to a portion of the portable electric assembly.

By locating the electric motor power cord 19 within the cavity 50 of the housing 18 in a location that is inaccessible to the user, the present invention prevents instances wherein a user wrongly or mistakenly grabs the electric motor power cord that is accessible to the user and uses it as the handle to carry the portable electrical assembly, which in turn minimizes or eliminates the resultant excessive strain and failure of the electric motor power cord associated therewith.

In addition, by disposing the electric motor power cord 19 within the cavity 50 of the housing 18 in a circular or helical manner and being configured to move within the cavity 50 in response to the movement of the electric motor 20 without the creation of sharp bends along its length as the electric motor 20 moves between all of its possible operating positions, the life of the electric motor power cord 19 can be increased by eliminating excessive strain associated with the straightening/unstraightening of the sharp bends as compared with electric motor power cords placed within a housing of the portable electrical assembly but having sharp bends along its length in order to connect and maintain the connection between the electric motor and power module.

The present invention can be easily incorporated into portable electrical assemblies, such as magdrills, in a wide variety of sizes, including in magdrills 10 sized from 2-inches or more. Moreover, the reconfiguration of the power cord 19 to be contained within a cavity 50 of the housing 18 does not impact the operation of such portable electrical assemblies, their state of operation is the same as with power cords 19 located on the assembly in an area that is accessible to the user.

While the invention has been described with reference to the examples above, it will be understood by those skilled in the art that various changes may be made, and equivalents may be substituted for elements thereof, without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all examples falling within the scope of the appended claims.

The invention claimed is:

1. A portable electric assembly comprising:
   a housing comprising:
     an outer side enclosure wall,
     an inner side enclosure wall spaced from said outer side enclosure wall,
     a top enclosure wall, and
     a bottom enclosure wall spaced from said top enclosure wall with said top enclosure wall and said bottom enclosure wall defining a length along a central axis therebetween,
     wherein said outer side enclosure wall, said inner side enclosure wall, said top enclosure wall and said bottom enclosure wall define a cavity therebetween;
   a power module coupled to said housing;
   an electric motor coupled to said housing and moveable relative to said power module between a plurality of operating positions including a resting position, an extended position, and one or more intermediate positions between said resting position and said extended position; and
   an electric motor power cord contained within said cavity and operatively connected to said electric motor at a first end and to said power module at a second end opposite said first end, said electric motor power cord circularly wrapped within the cavity about said central axis in a clockwise or counterclockwise direction so as to define a plurality of windings, and with said plurality of windings having a pitch defined by a distance measured along said central axis between an upper surface of an uppermost one of said plurality of windings and a lower surface of a lowermost one of said plurality of windings,
   wherein said plurality of windings are configured so that said pitch is a maximum pitch when said electric motor is in said resting position, and said pitch is a minimum pitch when said electric motor is in said extended position, said maximum pitch having a greater distance than said minimum pitch, and
   wherein said uppermost one of said plurality of windings is at a minimum gap distance along said length from said top enclosure wall and said lowermost one of said plurality of windings remains adjacent to said lower enclosure wall when said electric motor is in said resting position, with said minimum gap distance corresponding to said maximum pitch of said plurality of windings.

2. The portable electric assembly according to claim 1, wherein said uppermost one of said plurality of windings is at a maximum gap distance along said length from said top enclosure wall and said lowermost one of said plurality of windings remains adjacent to said lower enclosure wall when said electric motor is in said extended position, with said maximum gap distance corresponding to said minimum pitch of said plurality of windings.

3. The portable electric assembly according to claim 1, wherein said plurality of windings remain circularly coiled within said cavity in each one of said plurality of operating positions.

4. The portable electric assembly according to claim 1, wherein an outer diameter of each one of said plurality of windings remains constant in each one of said plurality of operating positions,
   wherein said outer diameter is measured by a line extending between a radially outward surface of one of said plurality of windings adjacent to said inner side enclosure wall and a radially outward surface of said one of said plurality of windings adjacent to said outer side enclosure wall with said line extending through said central axis.

5. The portable electric assembly according to claim 1, further comprising a power module housing coupled to said bottom enclosure wall, wherein said power module is contained within said power module housing.

6. The portable electric assembly according to claim 5, wherein said power module housing is integrally formed with said bottom enclosure wall of said housing.

7. The portable electric assembly according to claim 5, wherein said power module housing and said bottom enclosure wall define a coextensive opening, and wherein said second end of said electrical power cord extends through said coextensive opening to connect to said power module.

8. The portable electric assembly according to claim 1, wherein said inner side enclosure wall defines a slot opening through which said first end of said electric motor power cord is electrically coupled to said electric motor.

9. The portable electric assembly according to claim 1 further comprising:
   a slide assembly coupled to said housing and said electric motor; and
   a gear rotatably coupled to said housing and configured to engage said slide assembly to move said electric motor in said first direction or in said second direction.

10. The portable electric assembly according to claim 9 further comprising a handle coupled to said gear and configured to be actuated by a user to rotate said gear.

11. The portable electric assembly according to claim 1 further comprising:
    an arbor coupled to said electric motor and configured for rotation by said electric motor; and
    a cutter coupled to said arbor.

12. The portable electric assembly according to claim 1 further comprising a magnetic base mounted to said housing.

13. A drill assembly comprising:
    a housing comprising:
      an outer side enclosure wall,
      an inner side enclosure wall spaced from said outer side enclosure wall,
      a top enclosure wall, and
      a bottom enclosure wall spaced from said top enclosure wall with said top enclosure wall and said bottom enclosure wall defining a length along a central axis therebetween,
      wherein said outer side enclosure wall, said inner side enclosure wall, said top enclosure wall and said bottom enclosure wall define a cavity therebetween;
    a power module coupled to said housing;
    an electric motor coupled to said housing and moveable relative to said power module between a plurality of operating positions including a resting position, an extended position, and one or more intermediate positions between said resting position and said extended position; and an electric motor power cord contained within said cavity and operatively connected to said electric motor at a first end and to said power module at a second end opposite said first end, said electric motor power cord circularly wrapped within the cavity about said central axis in a clockwise or counterclockwise direction so as to define a plurality of windings, and with said plurality of windings having a pitch defined by a distance measured along said central axis between an upper surface of an uppermost one of said plurality of windings and a lower surface of a lowermost one of said plurality of windings;

a slide assembly coupled to said housing and said electric motor;

a gear rotatably coupled to said housing and configured to engage said slide assembly to move said electric motor in said first direction or in said second direction;

an arbor coupled to said electric motor and configured for rotation by said electric motor;

a cutter coupled to said arbor; and a magnetic base mounted to said housing, wherein said plurality of windings are configured so that said pitch is a maximum pitch when said electric motor is in said resting position, and said pitch is a minimum pitch when said electric motor is in said extended position, said maximum pitch having a greater distance than said minimum pitch, wherein said uppermost one of said plurality of windings is at a minimum gap distance along said length from said top enclosure wall and said lowermost one of said plurality of windings remains adjacent to said lower enclosure wall when said electric motor is in said resting position, with said minimum gap distance corresponding to said maximum pitch of said plurality of windings, and/or wherein said uppermost one of said plurality of windings is at a maximum gap distance along said length from said top enclosure wall and said lowermost one of said plurality of windings remains adjacent to said lower enclosure wall when said electric motor is in said extended position, with said maximum gap distance corresponding to said minimum pitch of said plurality of windings.

14. The drill assembly according to claim 13, wherein said plurality of windings remain circularly coiled within said cavity and wherein an outer diameter of each one of said plurality of windings remains constant as said electric motor moves between each one of said plurality of operating positions, and wherein said outer diameter is measured by a line extending between a radially outward surface of one of said plurality of windings adjacent to said inner side enclosure wall and a radially outward surface of said one of said plurality of windings adjacent to said outer side enclosure wall with said line extending through said central axis.

15. A portable electric assembly comprising:

a housing comprising:
an outer side enclosure wall,
an inner side enclosure wall spaced from said outer side enclosure wall,
a top enclosure wall, and
a bottom enclosure wall spaced from said top enclosure wall with said top enclosure wall and said bottom enclosure wall defining a length along a central axis therebetween,
wherein said outer side enclosure wall, said inner side enclosure wall, said top enclosure wall and said bottom enclosure wall define a cavity therebetween;

a power module coupled to said housing;

an electric motor coupled to said housing and moveable relative to said power module between a plurality of operating positions including a resting position, an extended position, and one or more intermediate positions between said resting position and said extended position; and an electric motor power cord contained within said cavity and operatively connected to said electric motor at a first end and to said power module at a second end opposite said first end, said electric motor power cord circularly wrapped within the cavity about said central axis in a clockwise or counterclockwise direction so as to define a plurality of windings, and with said plurality of windings having a pitch defined by a distance measured along said central axis between an upper surface of an uppermost one of said plurality of windings and a lower surface of a lowermost one of said plurality of windings, wherein said plurality of windings are configured so that said pitch is a maximum pitch when said electric motor is in said resting position, and said pitch is a minimum pitch when said electric motor is in said extended position, said maximum pitch having a greater distance than said minimum pitch, and wherein said uppermost one of said plurality of windings is at a maximum gap distance along said length from said top enclosure wall and said lowermost one of said plurality of windings remains adjacent to said lower enclosure wall when said electric motor is in said extended position, with said maximum gap distance corresponding to said minimum pitch of said plurality of windings.

* * * * *